United States Patent [19]
Cheng et al.

[11] Patent Number: 6,151,572
[45] Date of Patent: Nov. 21, 2000

[54] AUTOMATIC AND ATTENDANT SPEECH TO TEXT CONVERSION IN A SELECTIVE CALL RADIO SYSTEM AND METHOD

[75] Inventors: Yan-Ming Cheng, Schaumburg, Ill.; Lu Chang, Boca Raton, Fla.; Kenneth D. Finlon, Wellington, Fla.; Arthur G. Herkert, Lantana, Fla.

[73] Assignee: Motorola, Inc., Schaumburg, Ill.

[21] Appl. No.: 09/067,779

[22] Filed: Apr. 27, 1998

[51] Int. Cl.$^7$ .................................................. G10L 15/26
[52] U.S. Cl. ..................... 704/235; 704/271; 379/88.14
[58] Field of Search ........................ 455/563; 379/88.14; 704/235, 240, 271

[56] References Cited

U.S. PATENT DOCUMENTS

| | | | |
|---|---|---|---|
| 4,058,676 | 11/1977 | Wilkes et al. | 704/220 |
| 4,827,516 | 5/1989 | Tsukahara et al. | 704/224 |
| 5,396,542 | 3/1995 | Alger et al. | 379/67.1 |
| 5,485,543 | 1/1996 | Aso . | |
| 5,566,272 | 10/1996 | Brems et al. | 704/231 |
| 5,600,703 | 2/1997 | Dang et al. | 455/31.3 |
| 5,636,325 | 6/1997 | Farrett et al. . | |
| 5,659,597 | 8/1997 | Bareis et al. . | |
| 5,712,901 | 1/1998 | Meermans | 379/88.14 |
| 5,719,996 | 2/1998 | Chang et al. | 704/256 |
| 5,806,022 | 9/1998 | Rahim et al. | 704/231 |
| 5,828,993 | 10/1998 | Kawauchi | 704/202 |
| 5,870,454 | 2/1999 | Dahlen | 379/88.14 |
| 5,905,969 | 5/1999 | Mokbel et al. | 704/203 |

FOREIGN PATENT DOCUMENTS

98/05154   2/1998   WIPO .

OTHER PUBLICATIONS

Young, Jansen, Odell, Ollason and Woodland, *The HTK Book*, Entropic Cambridge Research Laboratory, Cambridge, England.

Joseph Picone, *Continuous Speech Recognition Using Hidden Markov Models*, IEEE ASSP Magazine, pp. 26–41, Jul. 1990.

Normandin, Cardin and De Mori, *High–Performance Connected Digit Recognition Using Maximum Mutual Information Estimation*, IEEE Transaction on Speech and Audio Processing, vol. 2, No. 2, Apr. 1994.

*Primary Examiner*—David R. Hudspeth
*Assistant Examiner*—Donald L. Storm
*Attorney, Agent, or Firm*—Randi L. Dulaney

[57] ABSTRACT

A radio communication system includes a voice recognition system (218), a transmitter (202) and a processing system (210). The voice recognition system is utilized for receiving caller initiated messages, and the transmitter is used for transmitting messages to a plurality of SCRs (selective call radios) (122) of the radio communication system. The processing system, which is coupled to the voice recognition system, and the transmitter, is adapted to cause the voice recognition system to convert a voice signal representative of a voice message originated by a caller of the radio communication system to a text message (401, 417), wherein the text message is intended for a SCR, to then generate a likelihood of success that the voice signal has been flawlessly converted to a text message, to have a human listen to an audible representation of the voice signal, and to cause the transmitter to transmit the text message to the SCR (432). The converting step includes autocorrelation by Fourier transform, measure a degree of voiceness for each band, applying the degree of voiceness to a corresponding plurality of phenome models, and deriving a text equivalent by searching through a phenome library.

10 Claims, 7 Drawing Sheets

AUTOMATIC AND ATTENDANT SPEECH TO TEXT CONVERSION IN A SELECTIVE CALL RADIO SYSTEM AND METHOD

RELATED INVENTION

The present invention is related to the following invention which is assigned to the same assignee as the present invention:

U.S. application Ser. No. 09/050,184 filed Mar. 30, 1998 by Andric et al., entitled "Voice Recognition System in a Radio Communication System and Method Therefor."

U.S. Pat. No. 6,073,094 issued Jun. 6, 2000 by Chang et al. entitled "Voice Compression by Phoneme Recognition and Communication of Phoneme Indexes and Voice Features."

FIELD OF THE INVENTION

This invention relates in general to radio communication systems, and particularly, to reliable conversion of voice in a radio communication system.

BACKGROUND OF THE INVENTION

Presently, voice recognition systems are becoming popular with consumers of conventional computers due to the availability of continuous speech recognition systems. These applications are generally tailored for speaker-dependent voice recognition. That is, to provide a high degree of accuracy in the conversion of voice to a textual message, the continuous speech recognition system must be trained by a particular speaker's voice. This is generally performed by having the speaker read a canned message of several paragraphs, which is then recorded and analyzed by the speech recognition system to develop a set of statistical models of the speaker's voice. These models are later used by the continuous speech recognition system to convert the speaker's voice signals into a textual message.

Although the present approach provides a relatively high degree of accuracy in the process of converting voice to a textual message, a need for higher degrees of accuracy approaching a flawless conversion is desirable. Present continuous speech recognition systems suffer several disadvantages in reaching a flawless conversion standard. For example, present algorithms rely heavily on the spectral envelope features of the analyzed speech signals to generate a textual message equivalent. This is disadvantageous because such a method fails to account for other features in speech such as the shape of the speech spectrum, which may be helpful in improving the accuracy of voice conversion. Additionally, present algorithms are not well adapted to recognize speech at a high degree of accuracy from speakers who have not trained the system with their particular voice characteristics.

Because of the foregoing limitations in prior art voice recognition systems, service providers of radio communication systems have opted to utilize human operators to transcribe voice messages to text messages from callers who intend to send messages to one or more SCRs (selective call radios) of the radio communication system. Service providers are generally hesitant in using a completely automated voice recognition system, because present voice recognition systems cannot guarantee flawless conversion of voice messages to text messages. The use of human operators, however, is expensive, especially for radio communication systems that operate 24 hours a day, every day of the year. Consequently, a need exists for automating the conversion of voice messages to text messages in a radio communication system to the extent that reliance on human operators to perform this conversion is either eliminated or substantially reduced.

Accordingly, what is needed is an apparatus and method for reliable conversion of voice in a radio communication system that satisfies present needs, and overcomes the foregoing disadvantages in the prior art.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
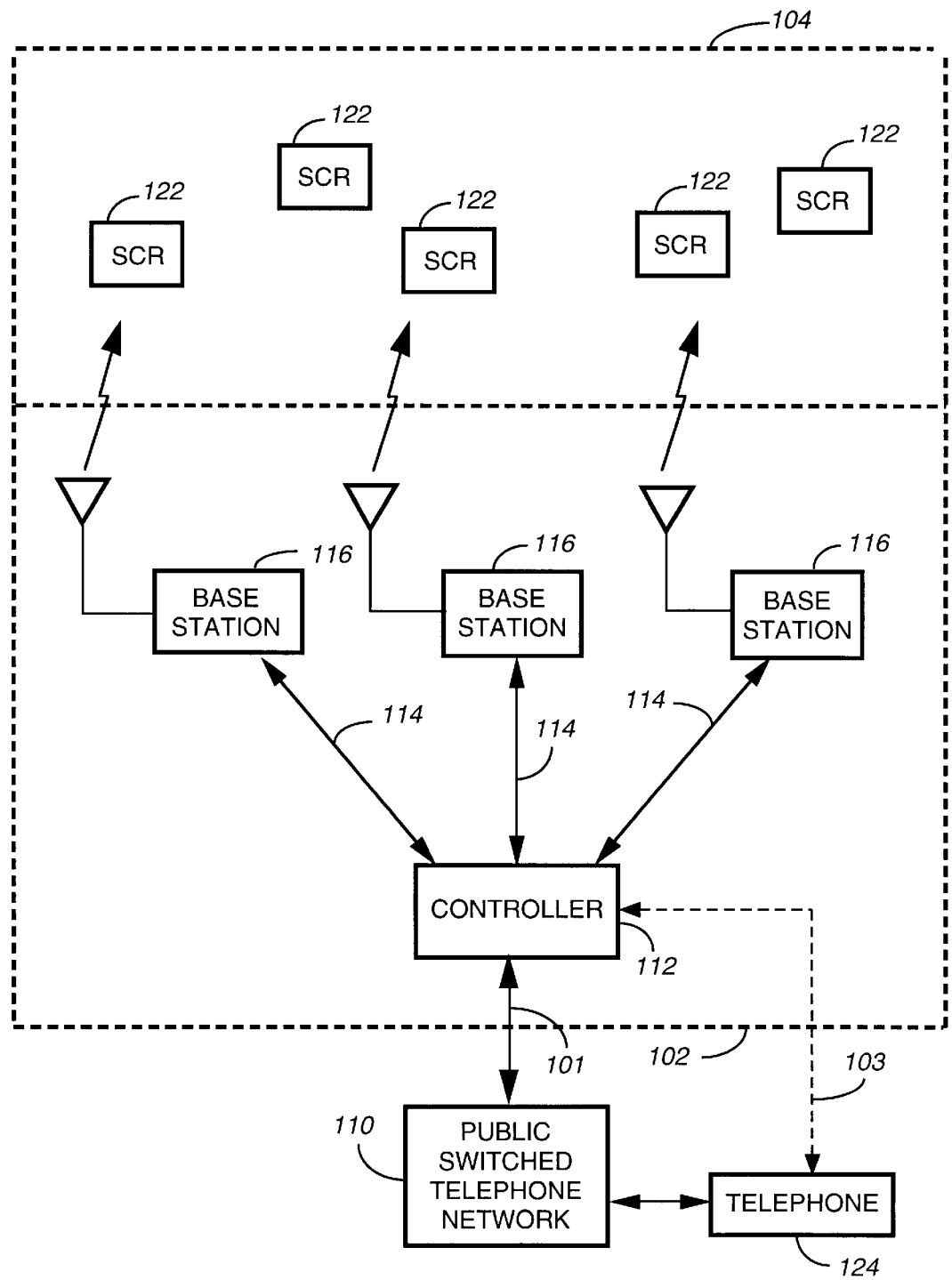
FIG. 1 is an electrical block diagram of a radio communication system according to the present invention.

FIG. 1 is an electrical block diagram of a radio communication system comprising a fixed portion 102 and a portable portion 104. The fixed portion 102 includes a controller 112 for controlling operation of a plurality of base stations 116 by way of conventional communication links 114, such as microwave links. The portable portion 104 includes a plurality of SCR's (selective call radios) 122 for receiving messages from the base stations 116 under the control of the controller 112. It will be appreciated that, alternatively, the radio communication system may be modified to support two-way communication between the SCR's 122 and the base stations 116. This modification may be achieved by the use of radio transceivers at both the SCR's 122 and the base stations 116.

Turning to the operation of the controller 112, we find that the controller 112 receives messages from callers utilizing a conventional telephone 124 for communicating with a conventional PSTN (public switch telephone network) 110. The PSTN 110 then relays messages to the controller 112 through a conventional telephone line 101 coupled to the controller 112. Upon receiving messages from the PSTN 110, the controller 112 processes the messages, and delivers them to the base stations 116 for transmission to designated SCR's 122. It will be appreciated that, alternatively, the telephone 124 may be directly coupled to the controller 112 by way of a conventional telephone line 103.

Figure 2:
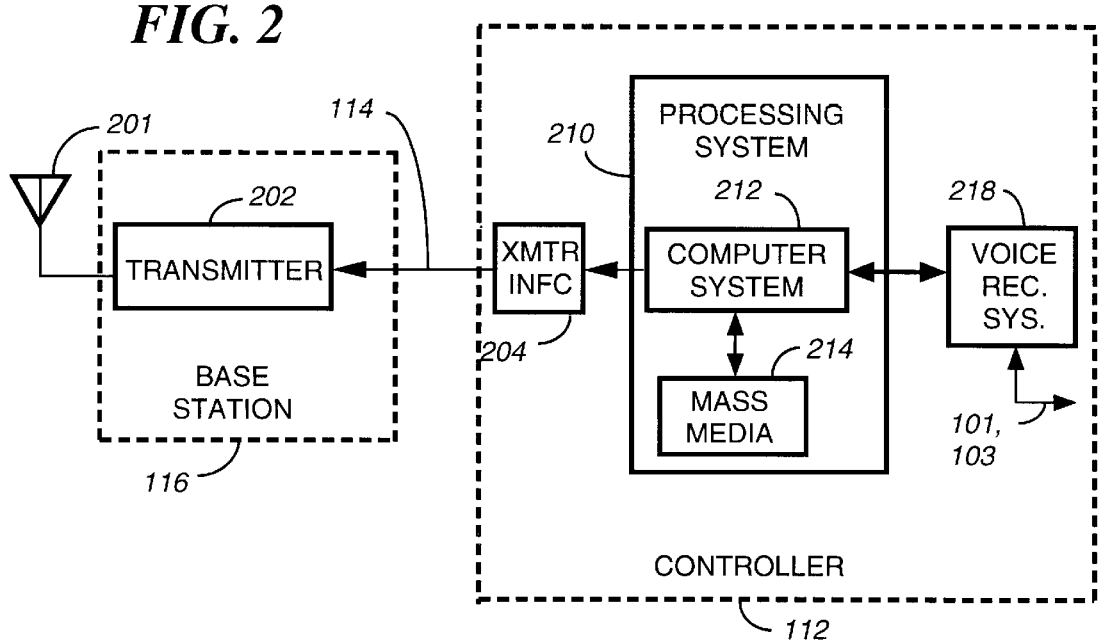
FIGS. 2 and 3 are electrical block diagrams of the fixed and portable portions of the radio communication system according to the present invention.
Figure 3:
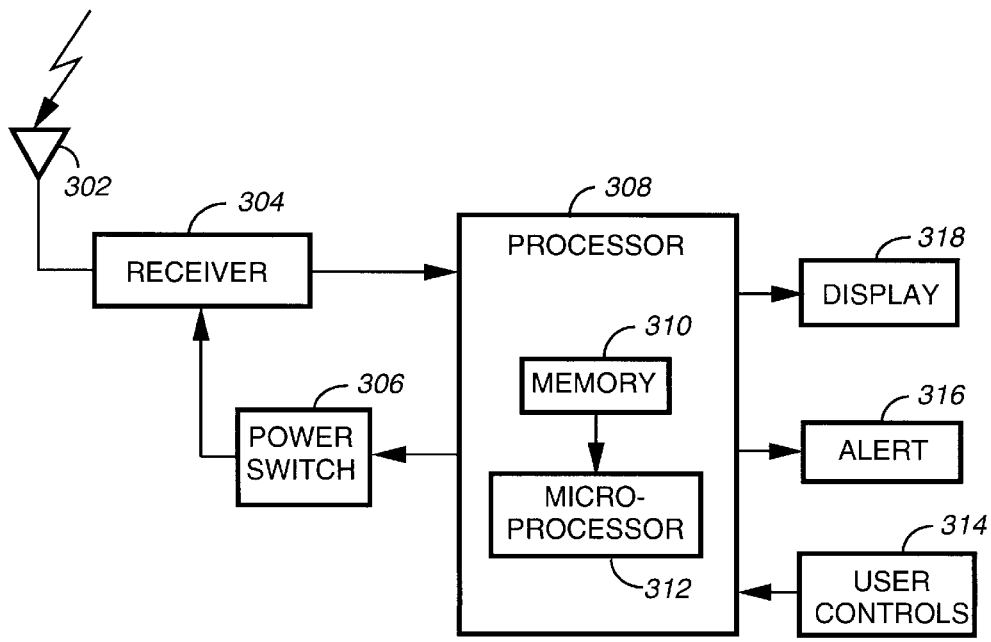

FIGS. 2 and 3 are electrical block diagrams of the fixed and portable portions 102, 104 of the radio communication system according to the present invention. The electrical block diagram of the fixed portion 102 includes the elements of the controller 112 and the base stations 116. The controller 112 comprises a conventional processing system 210 for controlling operation of the base stations 116, a voice recognition system 218, and a transmitter interface 204 for communicating messages to the base stations 116. The voice recognition system 218 receives voice messages from the PSTN 110, and/or from a direct telephone connection 103, and converts the voice messages to equivalent text messages. The processing system 210 includes conventional hardware such as a computer system 212 (with built-in random access memory (RAM)—not shown in FIG. 2) and mass media 214 (e.g., a conventional hard disk) to perform the programmed operations of the controller 112. The base stations 116 comprise a conventional RF transmitter 202 coupled to an antenna 201 for transmitting the messages received from the controller 112.

A detailed discussion of the SCR 122 will be postponed until after the fixed portion 102 has been discussed. To start this discussion, the reader is directed to FIGS. 5–6, which show flowcharts 400, 417 summarizing the operation of the radio communication system according to the present invention. The flowchart 400 depicts programmed instructions of the controller 112 which are initially stored in the mass media 214 and are then operated from the RAM included in the computer system 212.

The flowchart 400 begins with step 401 where a caller initiates communication with the radio communication system intending to send a message to a selected SCR 122. As noted earlier, this communication may originate from the PSTN 110 or a direct telephone connection 103 with the controller 112. In step 417, the caller's voice signal is converted to a textual equivalent of speech. After the conversion step 417, in a first embodiment, the text message is directly transmitted the selected SCR 122 in step 432. No further processing is required of the processing system 210. In an alternative embodiment, after the conversion step 417, the processing system 210 proceeds to step 418 where the voice recognition system 218 generates a likelihood of success (e.g., between 0% and 100%) that the voice signal has been flawlessly converted to a text message. In step 422, the processing system 210 compares the likelihood of success to a predetermined threshold.

The predetermined threshold is, for example, selected by the service provider of the radio communication system based on a minimum acceptable level of accuracy desired (e.g., confidence level below 90% is unacceptable) from the conversion step 417. In the event that likelihood of success generated in step 418 is below the predetermined threshold chosen, then the processing system 210 proceeds to step 424; otherwise, the processing system 210 proceeds to step 432 where the text message is transmitted to the targeted SCR 122. Turning to step 424, the processing system 210 prompts a human operator of the radio communication system to listen to an audible representation of the voice signal generated by the caller in step 401, and to generate a corrected text message in step 426.

Figure 4:
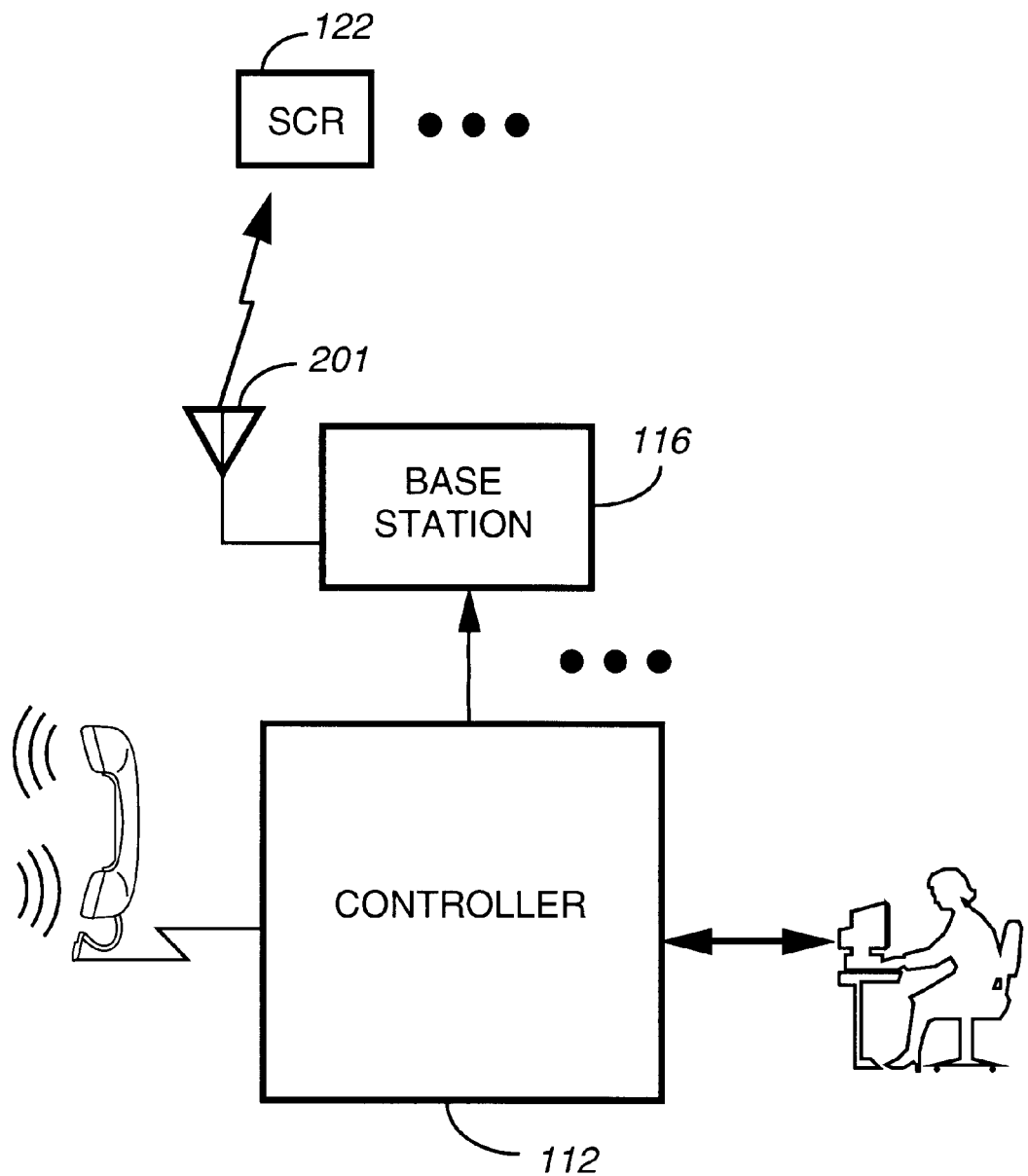
FIG. 4 depicts the use of a human operator in the radio communication system according to the present invention.

Step 426 may be accomplished, for example, by having the human operator sit at a computer terminal (see FIG. 4) coupled to the radio communication system, listening to the audible representation of the voice signal and transcribing at the computer terminal the caller's voice message in total. Once this has been completed, the human operator presents the corrected text message to the radio communication by prompting the radio communication system to accept the corrected text message. Presentation of the corrected message may be accomplished by depressing one or more predetermined keys on the computer terminal (e.g., CTRL T representative of a command to transmit the text message to the SCR 122). It will be appreciated that alternative conventional methods may exist for delivering the corrected text message to the radio communication system, and that any of these methods would be considered by one of ordinary skill in the art to be within the scope of the present invention.

It will be further appreciated that, alternatively, the human operator may listen audibly to the caller's voice message, and view contemporaneously the text message generated by the voice recognition system 218 in step 417 on a monitor of the computer terminal which the human operator is operating from. In doing so, the human operator may find that the text message was converted flawlessly, and no correction is necessary. It is worth noting that a likelihood of success below the predetermined threshold (e.g., 90%) does not necessarily mean that the conversion of the caller's voice message was flawed. For this reason, the human operator may find that a correction is not necessary after listening to the audible representation of the voice signal. Similarly, the human operator may find that the text message generated by the voice recognition system 218 in step 417 only has a few errors. In that case, the human operator would correct these flaws rather than transcribe the entire message.

Lastly, in the event that the human operator is unable to interpret the caller's voice message in step 426, the above embodiments describing step 426 are modified such that the controller 112 places the caller on hold while still communicating through the PSTN 110 or the direct telephone line 103 with the radio communication system. Once the human operator finds that the audible representation of the voice signal is incomprehensible in step 426, the human operator proceeds to contact the caller in step 428 and requests a repetition of the voice message in step 430. The human operator then transcribes the repeated voice message into a corrected text message.

Upon completion of any of the foregoing embodiments depicted by steps 417–430, the processing system 210 proceeds to step 432 whereby it causes a selected base station 116 to transmit the corrected text message to the SCR 122.

Figure 5:
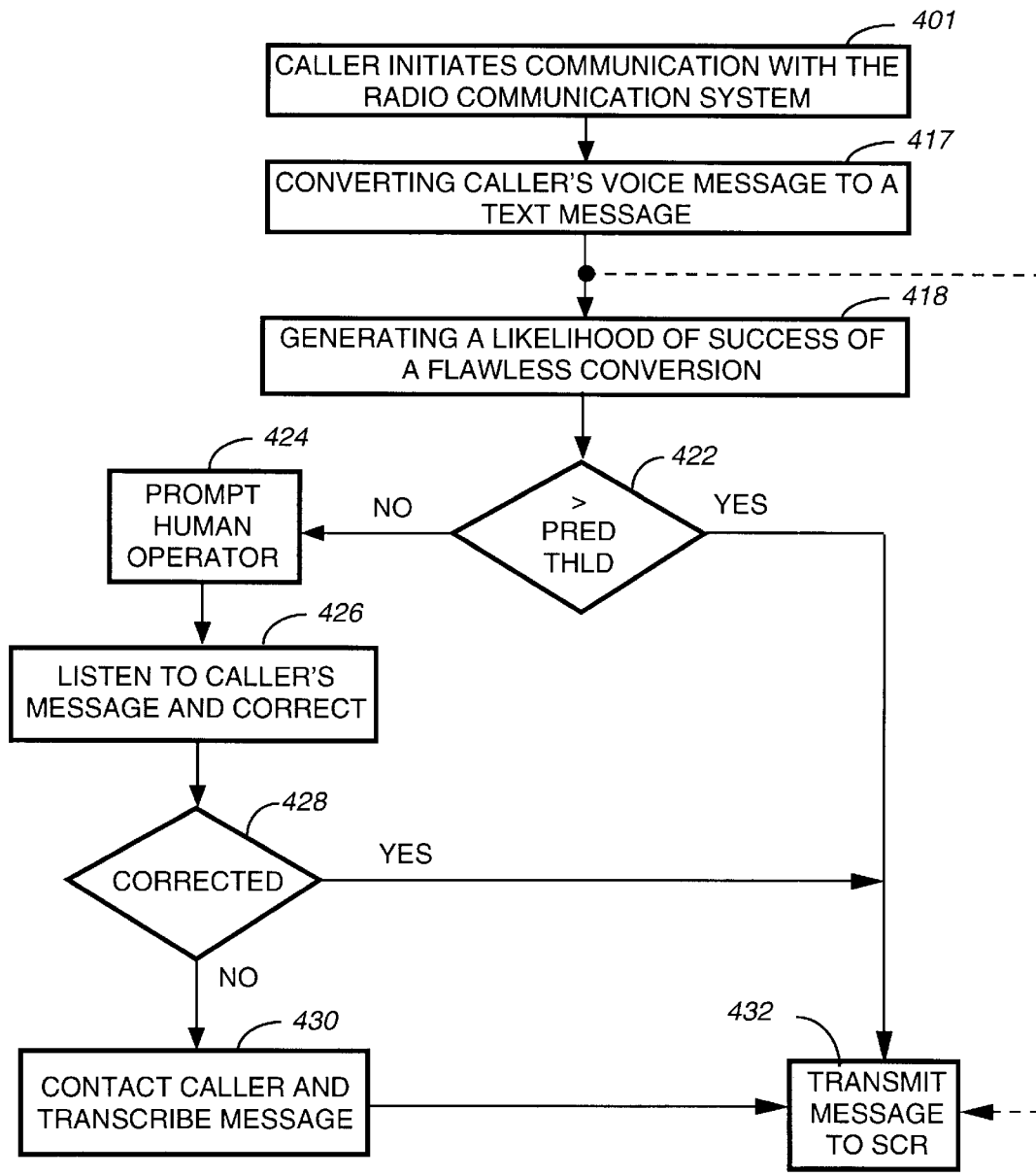
FIGS. 5–6 show flowcharts summarizing the operation of the radio communication system according to the present invention.
Figure 6:
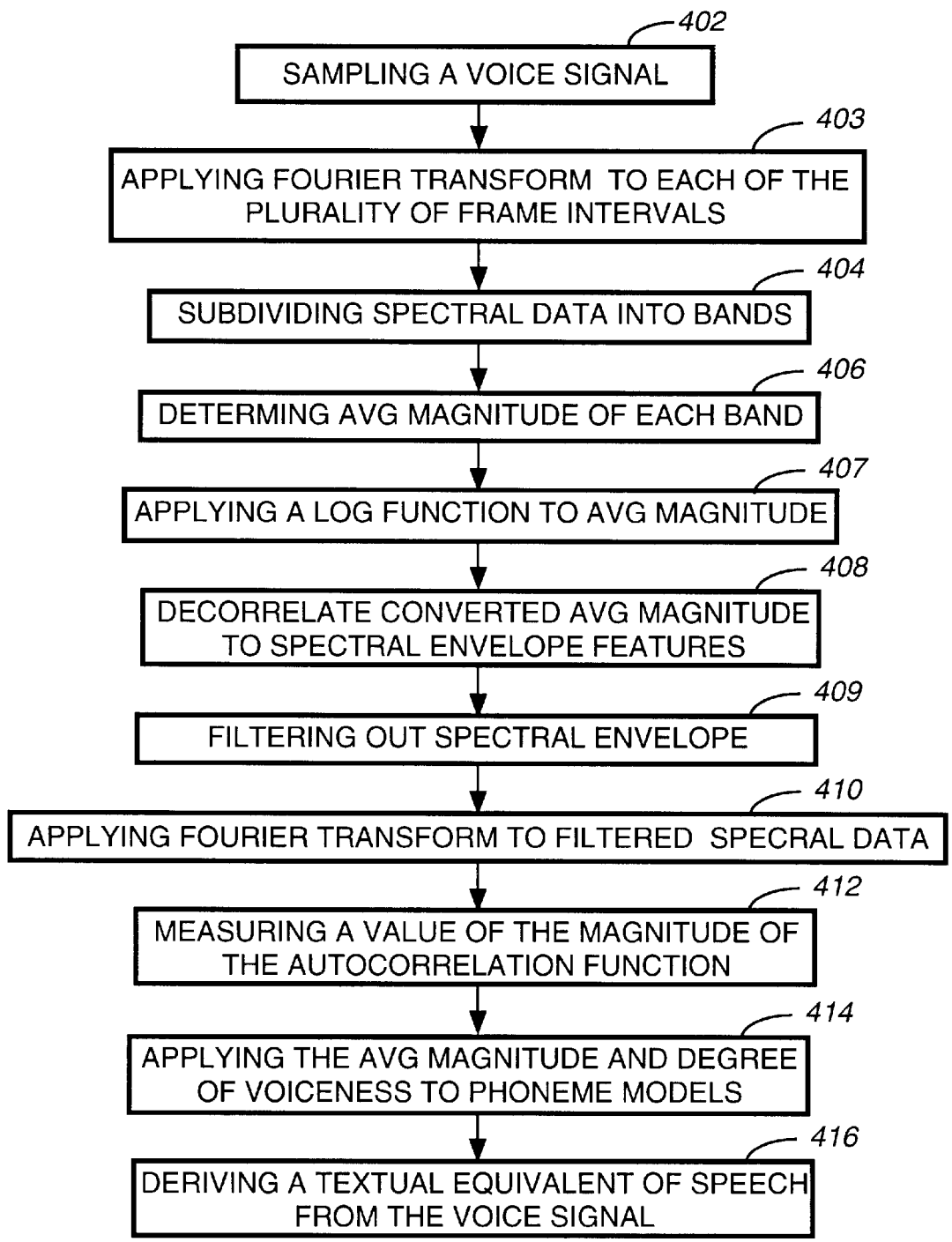

A prominent feature of the present invention which substantially reduces the use of a human operator as depicted in steps 424–430 of FIG. 5 is included in the voice recognition system 218. Although the present invention is not limited in scope to a single type of voice recognition system, the flowchart of FIG. 6 illustrates a preferred embodiment of the voice recognition system 218. This embodiment provides a high degree of first-time success in converting a caller's voice message to a textual message flawlessly, thereby limiting the frequency for which steps 424–430 are invoked.

Figure 7:
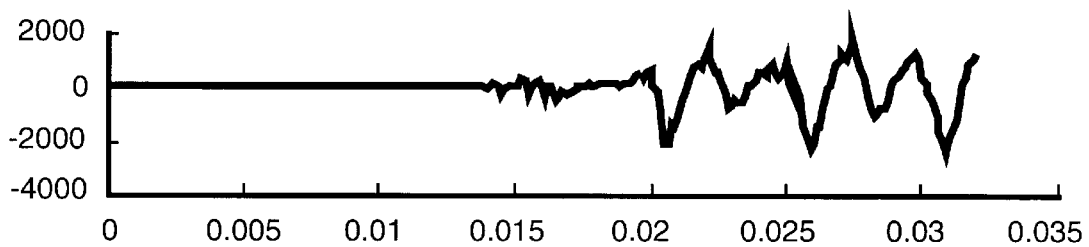
FIGS. 7–10 show graphs representative of the transformations made to voice signals generated by a caller according to the present invention.
Figure 8:
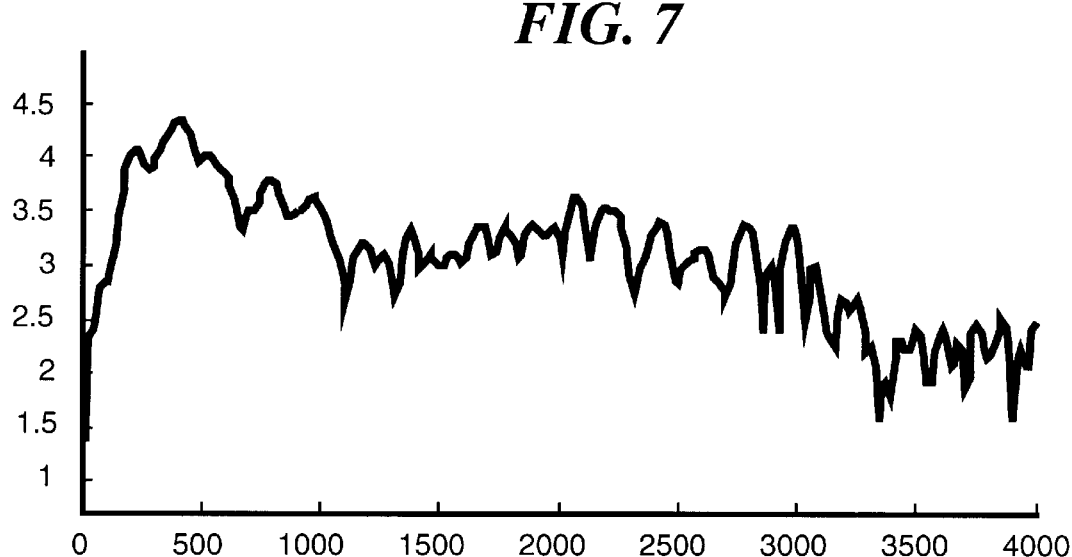

The process of converting voice to a textual message begins with step 402 where a voice signal originated by a caller in step 401 is sampled. An illustration of a voice signal is shown in FIG. 7. In step 403 the processing system 210 is programmed to apply a Fourier transform to a plurality of frame intervals of the sampled voice signal (e.g., 10–25 ms) to generate spectral data having a spectral envelope for each of the plurality of frame intervals. The Fourier transform applied in this step is preferably a fast Fourier transform. The spectral signal over a frame interval is shown in FIG. 8. Assuming the input speech signal is represented by $x_n$, the following equation describes the result of step 403:

$$P_k = \sum_{n=0}^{N-1} x_n e^{-j\frac{2\pi nk}{N}},$$

where $0 \leq k \leq N-1$.

In step 404, for each of the plurality of frame intervals, the spectral data is subdivided into a plurality of bands, each of the plurality of bands having a predetermined bandwidth (e.g., 400 Hz). It will be appreciated that, alternatively, each band may be of variable bandwidth. In step 406, the processing system 210 determines an average magnitude of the spectral data for each of the plurality of bands. Then in step 407 a logarithmic function is applied to the average magnitude to generate a converted average magnitude. In step 408, the converted average magnitude is then decorrelated (preferably with a discrete cosine transform) to generate spectral envelope features.

The controller 112 then proceeds to step 409 to filter out the spectral envelope from the spectral data of each of the plurality of frame intervals to generate filtered spectral data for each of the plurality of frame intervals. This step preferably comprises the steps of averaging the spectral data of each of the plurality of frame intervals to generate a spectral envelope estimate, and subtracting the spectral envelope estimate from the spectral data. These steps are substantially represented by the function, $$P'_k = f(i) * P_k, \text{ wherein } f(i) = \begin{cases} 1 & 0 \le i < L \\ -1 & -L < i < 0. \end{cases}$$

Figure 9:
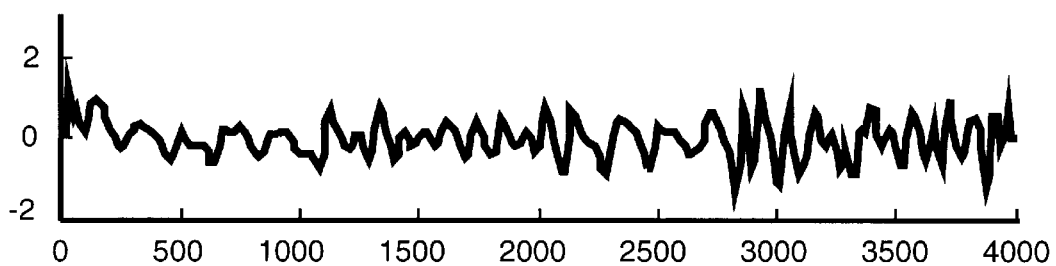

The function $f(i)$ is a 1-D Haar function well known in the art, and $P_k$ is the convolution of the Haar function with the original spectral data $P_k$. The result of filtering the spectral data is shown in FIG. 9.

Next, in step 410, a fast Fourier transform is applied to the filtered spectral data for each of the plurality of bands to generate an autocorrelation function for each of the plurality of bands. If there is a strong harmonic structure in the original spectral data, the autocorrelation function for each of the plurality of bands will have a high peak value around the value of its pitch period. For this reason, each autocorrelation function is preferably normalized by its corresponding spectral band energy. In step 412, the controller 112 proceeds to measure a value of the magnitude of the autocorrelation function for each of the plurality of bands. The value of the magnitude of the autocorrelation function is defined as a measure of a degree of voiceness for each of the plurality of bands.

There are two embodiments for measuring a value of the magnitude of the autocorrelation function. In a first embodiment, the value of the magnitude of the autocorrelation function corresponds to a peak magnitude of the autocorrelation function. Alternatively, in a second embodiment, for each of the plurality of frame intervals, the value of the magnitude of the autocorrelation function for each of the plurality of bands is determined by: (1) summing the autocorrelation function of each of the plurality of bands to generate a composite autocorrelation function, (2) determining a peak magnitude of the composite autocorrelation function, (3) determining from the peak magnitude a corresponding frequency mark, and (4) utilizing the corresponding frequency mark to determine a corresponding magnitude value for each of the plurality of bands.

Figure 10:
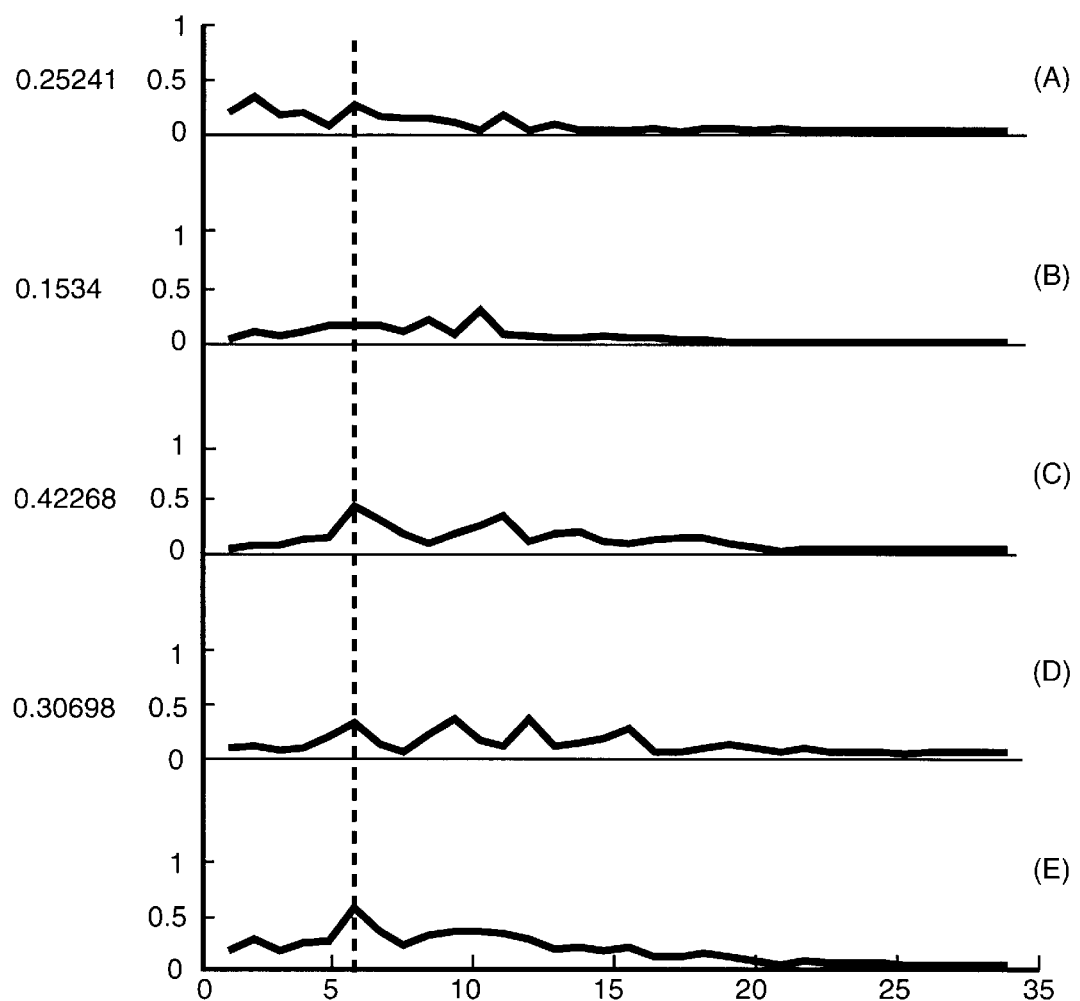

The second embodiment is illustrated in FIG. 10. Graphs (a)–(d) represent the autocorrelation function for each of bands 1–4. Graph (e) is the composite autocorrelation function as a result of summing the autocorrelation functions of bands 1–4. From the composite autocorrelation function a peak magnitude, and a corresponding frequency mark is determined. The corresponding frequency mark is then used to determine a corresponding magnitude value for each of the plurality of bands as shown in graphs (a)–(d).

As noted earlier, the value of the magnitude of the autocorrelation function is a measure of the degree of voiceness for each of the plurality of bands. After determining the degree of voiceness for each of the plurality of bands by either of the foregoing embodiments, in step 414, the spectral envelope features determined in step 408 and the degree of voiceness just discussed is applied to a corresponding plurality of phoneme models. Phoneme models are known in the art as models of speech determined from statistical modeling of human speech. In the art, phoneme models are also commonly referred to as Hidden Markov Models. A phoneme represents the smallest quantum of sound used by a speaker for constructing a word. For example, the word "is" may be decomposed into two phoneme sounds: "ih" and "z." Since individuals of differing cultures may speak with differing dialects, the word "is" may have more than one set of phoneme models to represent mismatched populations. For example, there may be individuals who end the word "is" with a "s" sound, i.e., "ih" and "s."

As a preferred embodiment, the phoneme models are determined over a large population of samples of human speech, which accounts for varying pronunciations based on varying speech dialectics. Deriving phoneme models from a large population allows for the present invention to operate as a speaker-independent voice recognition system. That is, the phoneme models are not dependent on a particular speaker's voice. With speaker-independent descriptions built into a phoneme model library, the controller 112 of the radio communication system can convert the voice of any speaker nation-wide without prior training of the caller's voice to a textual message. It will be appreciated, however, that the present invention may be altered so that a phoneme library may be constructed from training provided by one or more specific speakers, thereby forming a speaker-dependent phoneme library. Notwithstanding this alternative embodiment, the ensuing discussions will focus on a speaker-independent phoneme library.

Based on a speaker-independent phoneme library, the conversion of voice into a textual message, as indicated by step 416, is accomplished by comparing the spectral envelope features of the spectral data for each of the plurality of bands and the degree of voiceness for each of the plurality of bands with a library of speaker-independent phoneme models. From this comparison, a list of likely phonemes are identified, which are then compared to a dictionary of words (from, e.g., the English language) and their corresponding phonemes to derive a textual equivalent of speech from the processed voice signal of the caller. As part of the comparison processes for determining one or more likely phonemes, the following probability function is preferably used:

$$b_j(o_t) = \prod_{s=1}^{S} \left[ \sum_{m=1}^{M_s} c_{jsm} N\left(o_{st}; \mu_{jsm}, \sum\nolimits_{jsm}\right) \right]^{\gamma_s},$$

wherein $M_s$ is the number of mixture components in stream s. The variable S for the present invention is equal to 2, which represents the product of two probabilities. That is, one product represents the likelihood of a matched set of phoneme models based on the spectral envelope features of the spectral data per band, and another product represents the likelihood of a matched set of phoneme models based on the degree of voiceness per band. The variable $c_{jsm}$ is weighting factor, while the function N is a multivariate Gaussian function, wherein the variable $o_{st}$ is input data vectors representative of the spectral envelope features and degree of voiceness for each of the plurality of bands, and wherein $\mu_{jsm}$ and $\Sigma_{jsm}$ are the mean and covariance vectors of each of the phoneme models in the phoneme library. Lastly, the variable γ, is used for providing differing weights to the spectral envelope features probability result versus the degree of voiceness probability result. For example, the spectral envelope features probability result may be given a weight of 1.00 while the degree of voiceness probability result may be given a weight of 1.20. Hence, more importance is given to the outcome derived from the use of degree of voiceness data rather than the spectral envelope features data. It will be appreciated that any weight may be given to either product depending on the application in which the present invention is utilized.

Each of the probability results ($b_j$) is then compared over a stream of the plurality of frames to determine an equivalent textual version of the caller's voice message. In the event the comparison process leads to one or more possible textual streams, the textual stream with the greatest likelihood of success is chosen according to a composite probability result for each branch. Once the textual result with the greatest likelihood of success has been chosen, the controller 112 proceeds to steps 418–426 of FIG. 5 as discussed earlier.

This article is useful for gaining further insight into the use of the foregoing equation (represented by $b_j$) to predict the likelihood of a stream of phonemes derived from a voice signal.

A detailed description of the foregoing equation (represented by $b_j$) to predict the likelihood of a stream of phonemes is more fully described in Steve Young, "The HTK Book," Entropic Cambridge Research Laboratory, Cambridge CB3 OAX, England, which is hereby incorporated herein by reference. Additionally, the reader is directed to the following introductory materials related to voice recognition systems, which are described in Joseph Picone, "Continuous Speech Recognition Using Hidden Markov Models," IEEE ASSP Magazine, July 1990, pp. 26–40, and Yves Normandin, "High-Performance Connected Digit Recognition Using Maximum Mutual Information Estimation," IEEE Transactions on Speech and Audio Processing, Vol. 2, No. 2, April 1994, respectively, which are hereby incorporated herein by reference.

The foregoing method and apparatus are substantially advantages over prior art systems. First, the use of a voice recognition system for converting voice messages to text messages substantially reduces the need for human operators for transcribing messages, thereby reducing cost. Second, although not necessarily required for the present invention, employing a preferred embodiment for the operation of the voice recognition system 218 as depicted by the flowchart of FIG. 5 adds further improvement to the present invention over the prior art. Particularly, the reader is reminded from the background of the invention that prior art systems have a limited success rate of converting voice messages to textual messages due to an emphasis put on deriving textual messages based on the spectral envelope features of the analyzed speech signal.

In contrast, the present invention takes advantage of analyzing the texture of the speech spectrum (described above as the degree of voiceness) along with the spectral envelope features of the speech signal. By utilizing both magnitude data of the spectral signal and degree of voiceness data for comparison to a phoneme library, the present invention provides a higher degree of accuracy for flawlessly converting speaker-dependent and speaker-independent voice signals to a text message.

Having summarized the fixed portion 102 of the radio communication system, the reader's attention is now directed to FIG. 3, which shows an electrical block diagram of the SCR 122 according to the present invention. As noted in step 432 of FIG. 5, the SCR 122 receives textual messages (in the form of, e.g., alpha-numeric messages) generated by a caller after having been processed by the fixed portion 102 of the radio communication as described by the flowcharts of FIGS. 5–6. The SCR 122 comprises a receiver 304 coupled to an antenna 302, a power switch 306, a processor 308, an alerting device 316, a display 318, and user controls 314. The receiver 304 and antenna 302 are conventional RF elements for receiving messages transmitted by the base stations 116. The power switch 306 is a conventional switch, such as a MOS (metal oxide semiconductor) switch for controlling power to the receiver 304 under the direction of the processor 308, thereby providing a battery saving function.

The processor 308 is used for controlling operation of the SCR 122. Generally, its primary function is to decode and process demodulated messages provided by the receiver 304, storing them and alerting a user of the received message. To perform this function, the processor 308 comprises a conventional microprocessor 312 coupled to a conventional memory 310 including nonvolatile and volatile memory portions, such as a ROM (read-only memory) and RAM (random-access memory). One of the uses of the memory 310 is for storing messages received from the base stations 116. Another use is for storing one or more selective call addresses utilized in identifying incoming messages belonging to the SCR 122.

Once a message has been decoded and stored in the memory 310, the processor 308 activates the alerting device 316 which generates a tactile and/or audible alert signal to the user. With the display 318, which is, for example, a conventional LCD (liquid crystal display) and conventional user controls 314, the user may process the received messages. The user controls 314 provide options such as reading, deleting, and locking of messages.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a radio communication system, a method comprising the steps of:

converting a voice signal representative of a voice message originated by a caller to a text message, wherein the text message is intended for a SCR (selective call radio);

generating a likelihood of success that the voice signal has been flawlessly converted to a text message;

comparing the likelihood of success to a predetermined threshold;

if the likelihood of success is below the predetermined threshold, prompting a human operator of the radio communication system to:

listen to an audible representation of the voice signal, and generate a corrected text message; and transmitting the corrected text message to the SCR.

2. The method as recited in claim 1, wherein the converting step comprises the steps of:

sampling a voice signal;

applying a Fourier transform to a plurality of frame intervals of the sampled voice signal to generate spectral data having a spectral envelope for each of the plurality of frame intervals;

subdividing the spectral data for each of the plurality of frame intervals into a plurality of bands;

filtering out the spectral envelope from the spectral data of each of the plurality of frame intervals to generate filtered spectral data for each of the plurality of frame intervals;

applying a Fourier transform to the filtered spectral data for each of the plurality of bands to generate an autocorrelation function for each of the plurality of bands;

measuring a value of the magnitude of the autocorrelation function for each of the plurality of bands, whereby the value is a measure of a degree of voiceness for each of the plurality of bands;

applying the degree of voiceness for each of the plurality of bands to a corresponding plurality of phoneme models; and deriving a textual equivalent of speech from the voice signal by searching through a phoneme library according to predictions made by the corresponding plurality of phoneme models.

3. The method as recited in claim 2, further comprising the steps of:

determining an average magnitude for each of the plurality of bands;

applying a logarithmic function to the average magnitude to generate a converted average magnitude;

decorrelating the converted average magnitude to generate spectral envelope features; and applying the spectral envelope features for each of the plurality of bands to the corresponding plurality of phoneme models.

4. The method as recited in claim 2, wherein the value of the magnitude of the autocorrelation function is a peak magnitude.

5. The method as recited in claim 2, wherein for each of the plurality of frame intervals, the value of the magnitude of the autocorrelation function for each of the plurality of bands is determined by:

summing the autocorrelation function of each of the plurality of bands to generate a composite autocorrelation function;

determining a peak magnitude of the composite autocorrelation function;

determining from the peak magnitude a corresponding frequency mark; and utilizing the corresponding frequency mark to determine a corresponding magnitude value for each of the plurality of bands.

6. The method as recited in claim 2, further comprising the step of normalizing the autocorrelation function for each of the plurality of bands by its corresponding spectral band energy.

7. The method as recited in claim 2, wherein the Fourier transform comprises a fast Fourier transform.

8. The method as recited in claim 2, wherein the step of filtering out the spectral envelope comprises the steps of:

averaging the spectral data of each of the plurality of frame intervals to generate a spectral envelope estimate; and subtracting the spectral envelope estimate from the spectral data of each of the plurality of frame intervals.

9. A radio communication system, comprising:

a voice recognition system for receiving caller initiated messages;

a transmitter for transmitting messages to a plurality of SCRs (selective call radios) of the radio communication system; and a processing system coupled to the voice recognition system, and the transmitter, wherein the processing system is adapted to:

cause the voice recognition system to convert a voice signal representative of a voice message originated by a caller of the radio communication system to a text message, wherein the text message is intended for a SCR;

cause the voice recognition system to generate a likelihood of success that the voice signal has been flawlessly converted to a text message;

compare the likelihood of success to a predetermined threshold;

if the likelihood of success is below the predetermined threshold, prompting a human operator of the radio communication system to:

listen to an audible representation of the voice signal, and generate a corrected text message; and cause the transmitter to transmit the corrected text message to the SCR.

10. The radio communication system as recited in claim 9, wherein the voice recognition system is adapted to:

sample a voice signal generated by a caller during a plurality of frame intervals, wherein the voice signal is representative of a message intended for a selective call radio;

apply a Fourier transform to a plurality of frame intervals of the sampled voice signal to generate spectral data having a spectral envelope for each of the plurality of frame intervals;

subdivide the spectral data for each of the plurality of frame intervals into a plurality of bands;

filter out the spectral envelope from the spectral data of each of the plurality of frame intervals to generate filtered spectral data for each of the plurality of frame intervals;

apply a Fourier transform to the filtered spectral data for each of the plurality of bands to generate an autocorrelation function for each of the plurality of bands;

measure a value of the magnitude of the autocorrelation function for each of the plurality of bands, whereby the value is a measure of a degree of voiceness for each of the plurality of bands;

apply the degree of voiceness for each of the plurality of bands to a corresponding plurality of phoneme models;

derive a textual equivalent of speech from the voice signal by searching through a phoneme library according to predictions made by the corresponding plurality of phoneme models; and cause the transmitter to transmit the textual equivalent of speech to the selective call radio, wherein the textual equivalent of speech is representative of the message initiated by the caller.

* * * * *